US010386015B2

(12) United States Patent
Kuijpers et al.

(10) Patent No.: US 10,386,015 B2
(45) Date of Patent: Aug. 20, 2019

(54) LUBRICATING DEVICE WITH A CONTROL UNIT FOR OPERATING THE LUBRICATING PUMP

(71) Applicants: Toon Kuijpers, Den Bosch (NL); Georgo Angelis, Oss (NL); Guus Willems, Utrecht (NL)

(72) Inventors: Toon Kuijpers, Den Bosch (NL); Georgo Angelis, Oss (NL); Guus Willems, Utrecht (NL)

(73) Assignee: Aktiebolaget SKF, Göteborg (SE)

( * ) Notice: Subject to any disclaimer, the term of this patent is extended or adjusted under 35 U.S.C. 154(b) by 683 days.

(21) Appl. No.: 15/086,805

(22) Filed: Mar. 31, 2016

(65) Prior Publication Data

US 2016/0290558 A1    Oct. 6, 2016

(30) Foreign Application Priority Data

Mar. 31, 2015  (GB) .................................. 1505505.6

(51) Int. Cl.
*F16N 11/08*    (2006.01)
*F16N 29/04*    (2006.01)

(52) U.S. Cl.
CPC .............. *F16N 29/04* (2013.01); *F16N 11/08* (2013.01); *F16N 2230/10* (2013.01); *F16N 2250/00* (2013.01)

(58) Field of Classification Search
CPC ...... F16N 29/04; F16N 11/08; F16N 2230/10; F16N 19/003; F16N 13/02
See application file for complete search history.

(56) References Cited

U.S. PATENT DOCUMENTS

| 3,674,112 A | * | 7/1972 | Roberts | F01M 1/18 184/6.1 |
| 4,787,479 A | * | 11/1988 | Ostermeyer | B60R 17/02 184/7.2 |
| 4,967,881 A | * | 11/1990 | Meuer | B60R 17/02 184/6.4 |
| 5,165,502 A | * | 11/1992 | Hirose | F16N 7/385 184/27.1 |

(Continued)

FOREIGN PATENT DOCUMENTS

| CN | 1185825 A | 6/1998 |
| CN | 101769414 A | 7/2010 |

(Continued)

*Primary Examiner* — Michael R Mansen
*Assistant Examiner* — Mark K Buse
(74) *Attorney, Agent, or Firm* — Bryan Peckjian; SKF USA Inc. Patent Dept.

(57) ABSTRACT

The invention relates to a lubricating device that includes a lubricant pump, a lubricant reservoir for supplying lubricant to a machine to be lubricated, a control unit for determining an operating state of a machine and for operating the lubricant pump based on the signals of at least one sensor configured to detect emissions emanating from the machine to be lubricated, and a housing configured to be attached to a lubrication nozzle of the machine to be monitored. It is proposed that a reading of the signals of the sensor by the control unit is limited to a predetermined set of time windows with a predetermined width, wherein the time windows are separated by an interval where the signals of the sensor are not read.

14 Claims, 4 Drawing Sheets

(56) References Cited

U.S. PATENT DOCUMENTS

| | | | | |
|---|---|---|---|---|
| 5,271,528 | A * | 12/1993 | Chien | F16N 11/08 184/38.4 |
| 5,381,874 | A * | 1/1995 | Hadank | F16N 29/02 184/6 |
| 5,671,825 | A * | 9/1997 | Wong | F16C 19/52 184/6.4 |
| 5,823,295 | A * | 10/1998 | Griffith | F16N 7/385 184/6.4 |
| 5,971,107 | A * | 10/1999 | Stitz | F16C 27/045 184/108 |
| 6,202,014 | B1 * | 3/2001 | Brandt | E02F 3/3414 172/12 |
| 6,354,816 | B1 * | 3/2002 | Yang | F16N 11/08 184/37 |
| 6,561,316 | B1 * | 5/2003 | Graf | F16C 33/6625 184/105.1 |
| 7,313,956 | B1 * | 1/2008 | Murphy, Sr. | G01F 23/70 73/305 |
| 9,279,349 | B2 * | 3/2016 | Hutchinson | F01L 3/24 |
| 9,683,652 | B2 * | 6/2017 | Poster | B64C 27/12 |
| 10,107,451 | B2 * | 10/2018 | Wech | F16N 19/003 |
| 2004/0099483 | A1 * | 5/2004 | Song | F16N 11/08 184/105.1 |
| 2010/0147627 | A1 * | 6/2010 | Lakomiak | F16C 33/6674 184/7.4 |
| 2012/0132303 | A1 * | 5/2012 | Conley | F16N 7/14 137/565.17 |
| 2012/0132483 | A1 * | 5/2012 | Conley | F16N 7/14 184/6.4 |
| 2013/0168188 | A1 * | 7/2013 | Donovan | F16N 7/14 184/6 |
| 2018/0034407 | A1 * | 2/2018 | Chouk | H02P 29/60 |
| 2018/0085874 | A1 * | 3/2018 | Haas | F16N 7/32 |

FOREIGN PATENT DOCUMENTS

| | | |
|---|---|---|
| CN | 101784760 A | 7/2010 |
| CN | 103542246 A | 1/2014 |
| DE | 102013203263 A1 | 8/2014 |
| GB | 2463948 A | 4/2010 |
| KR | 100741820 B1 | 7/2007 |
| TW | 201319445 A | 5/2013 |

* cited by examiner

LUBRICATING DEVICE WITH A CONTROL UNIT FOR OPERATING THE LUBRICATING PUMP

CROSS-REFERENCE TO RELATED APPLICATIONS

This application claims priority to Great Britain patent application no. 1505505.6 filed on Mar. 31, 2015, the contents of which are fully incorporated herein by reference.

FIELD OF THE INVENTION

The invention relates to lubrication device for automatized lubrication of machines or other mechanical devices.

BACKGROUND OF THE INVENTION

It is known to provide devices such as electro-motors, electric fans or other machines with lubricators having a replaceable, refillable lubricant reservoir and a lubricant pump continuously supplying lubricant to the relevant parts of the device. Lubricators may further include control units driving the lubricant pump. It is desirable that the lubrication is switched off when the device is not operating in order to avoid waste and build-up of lubricant being pumped into the device while the latter is not operating.

The document GB 2463948 A discloses a lubricator and a controller for use in a vehicle, wherein the controller switches the lubricator off when the vehicle is stationary.

The document TW201319445 A1 discloses an oil/grease injection mechanism controlling its operation mode by vibration frequency detection and a method for controlling an operation mode of oil/grease injectors. The oil/grease injectors include a motor, an oil/grease pack, a delivery pipeline and a central processing unit. The central processing unit is electrically connected with a motor to control the operation of the motor to control whether the grease of the oil/grease pack is supplied to the lubrication element via the delivery pipeline. The vibration sensors are disposed in the oil/grease injectors or on the device being lubricated and are electrically connected to the central processing unit to sense the vibration frequency of the device being lubricated and to transmit a signal to the central processing unit. The central processing unit uses the amplitude value of the signal to detect an operating state of the device being lubricated.

Both TW201319445 A1 and GB 2463948 A require a continuous monitoring of the operating state of the device, which requires a continuous supply of energy and computational power.

SUMMARY OF THE INVENTION

The invention seeks to provide a lubricating device capable of reliably detecting long downtimes of machines to be lubricated so as to avoid accumulation of lubricant while minimizing energy consumption and computational complexity.

The invention relates to a lubricating device including a lubricant pump, a lubricant reservoir for supplying lubricant to a machine to be lubricated determining an operating state of a machine, a control unit for operating the lubricant pump based on the signals of a sensor configured to detect emissions emanating from the machine to be lubricated, and a housing configured to be attached to a lubrication nozzle of the machine to be monitored.

The invention proposes that a reading of the signals of the sensor by the control unit is limited to a predetermined set of time windows with a predetermined width, wherein the time windows are separated by an interval. The signals of the sensor are not read within the intervals. The intervals separating the time windows correspond to periods where the control unit does not need to execute monitoring tasks such that the pertinent energy consumption and use of computational power can be avoided. The purpose of avoiding the accumulation of lubricant being pumped into the device being lubricated while the device is not operating can be achieved even when the monitoring of the operating state of the device is done with the very low time resolution. It is typically sufficient to switch off the lubricant pump when the machine is not running for multiple hours, days or weeks while stops of a few minutes or intervals up to one hour do not lead to a significant aggregation of lubricant even when the lubricant pump keeps running. By setting the ratio between frequency of the data sampling windows and width of the windows, a suitable balance between time resolution of the detection of the operating state and energy consumption and complexity can be achieved and adapted based on the requirements in this specific technical field.

The invention applies in particular, but not exclusively, to autonomous lubricators without communication interface or energy supply interface to a control unit of the machine being lubricated.

In a preferred embodiment of the invention, the control unit is configured to determine an operating state of the machine to be lubricated based on the signals of the sensors. The control unit may be configured to simply detect an "On" state and an "Off" state of the machine, i.e. if the machine is running or not, and may differentiate between different kinds of On-states, e.g. states with rotational speeds falling in different ranges or classes of rotational speeds.

As will be further discussed below, the detection of ON and OFF states is preferably achieved by a statistical analysis using techniques of the statistical hypothesis testing. Reliable results for statistical hypothesis testing can be achieved for large samples with many data points. The inventors have found that the time windows are preferably chosen such that at least 100 data points, more preferably 500 data points, of the sensor signal are sampled. The sensor maybe digital sensor e.g. on a chip periodically issuing signals which can be digital and/or pre-processed and filtered or an analog sensor.

Preferably, the width of the time windows is at least ten times smaller than the average ON-time and the average OFF-time machine to be monitored. Accordingly, the probability that the window overlaps with a switchover period wherein the operating mode of the machine is switched from ON to OFF or vice versa is reasonably low. If the sampling window would overlap with such a switching phase, the detection results would be compromised but the impact is not severe for the decision nor on the lubrication-rate. The lubrication interval is large compared to the time-window for diagnosis.

Further, this proposed that the control unit is configured to determine at least one statistical parameter of a sample of sensor signals, to compare the statistical parameter with at least one predetermined threshold value and to determine an operating state based on the result of the comparison.

The statistical processing can be easily implemented using well-established algorithms for statistical hypothesis testing with low computational complexity.

In a possible embodiment of the invention, the control unit may use different threshold values for switching from an ON-mode to an OFF-mode or from the OFF-mode to the ON-mode such that hysteresis is generated. The threshold values may be preset in the factory and changed by the end-user following SKF advised pre-settings, using a dial or something similar.

Depending on the circumstances, the statistical parameter may be the variance, a standard deviation, a mean value or any suitable combination thereof. In case of unipolar sensor signals with an amplitude which is always positive, the mean value can change as a function of the operating state of the device being lubricated. In the case of bi-polar sensor signals wherein the mean value does not change when the machine is being switched from the idle mode to the non-idle mode, the statistical test can be based on the variance or on the standard deviation. For bi-polar signals it can also be necessary to rectify the signals and to determine and use the mean (e.g. rms) or the variance or spread around the mean in a statistical hypothesis test to determine the ON or OFF state.

It is further proposed that the control unit is configured to switch into an OFF-mode when no lubricant is supplied or into a safety lubrication mode upon detecting an OFF-state of the machine to be monitored for two or more subsequent samples of sensor signals. This avoids the activation of the lubricator in small periods of down time where the deactivation or activation is not necessary or helpful.

In a preferred embodiment of the invention, the sensor is accommodated in the housing. It has turned out that the vibrations of the machine are mostly transmitted to the housing of the lubricator with an attenuation which is such that the reliable detection of the operating status is still possible. In other embodiments of the invention, the sensor may be attached to the housing of the machine to be lubricated and connected to the control unit by wire or cable.

In a preferred embodiment of the invention, the sensor is a vibration sensor or accelerometer. The sensor may further be formed as or be complemented by other types of sensor such as acoustic emission sensors, temperature sensors, pressure sensors or the like. Preferably, the sensing principle should be such that it can be implemented inside of the housing and can work without additional external wires, all battery powered. The sensor signal should change in amplitude and/or, frequency-spectrum content depending on the operating state of the machine.

One possible embodiment is to use a vibration-sensor (single- or multi-axis) and use it as a threshold crossing detector and count the number of threshold crossings during a time-window as a detection mechanism, differentiating the "On" state from the "Off" state. Some vibration sensors formed as chips already exist with a process-unit integrated in such a chip and it can be configured in amplitude-sensitivity, threshold-level, frequency-range, averaging-length and data-output rate, etc.

An alternative embodiment which may incorporate a vibration sensor, preferably in the form of a chip-device described above, can be a vibrating-structure which is designed in such a way that it is sensitive to or has one or more resonance frequencies around the operating rotation frequency of the pump, or machine, which typically will have operating frequencies in relation to the line-frequency (50 Hz in Europe, 60 Hz USA). In Europe, the operating frequencies of induction motors are depending on the number of magnetic poles, typically 12.5, 25, 50 Hz or multiples.

An example of such an embodiment can be a vibrating-structure formed as a piece of thin-sheet-metal or plastic of specific length and a mass at the end, which vibrates like a clamped-free beam structure or a clamped-clamped beam structure known from classical vibration theory. The mass may incorporate the vibration-detection chip. An alternative vibrating structure can be a vibrating string with a mass attached. If such a string or vibrating structure is attached to the piston in the grease canister it can be used to detect not only the operating state of the machine but also of the correct functioning of the lubricator and of the remaining grease volume in the canister (reservoir). If the spring tension is depending on the piston-position such that the tension increases and the frequency increases or oppositely that a pre-tension, factory-set, is released and thus the resonance or string frequency decreases, this can be a mechanism to detect the shifting of the piston position and thus detect a correct functioning of the lubricator and it detects the remaining grease-volume. As the piston is operated in the direction of the pre-tension, additional energy consumption required for tensioning the spring can be avoided.

According to a further aspect of the invention, the control unit is configured to switch into a safety lubrication mode upon detecting an off-state of the machine to be monitored, wherein a nonzero amount of lubricant is supplied to the machine in the safety lubrication mode. The nonzero amount of lubricant is smaller than an amount of lubricant supplied in at least one operation mode employed when an on-state has been detected.

The amount of lubricant supplied in the safety lubrication mode is such that severe damages of the machine can be avoided even in the case where the OFF-state is detected erroneously or where the ON-state is detected with a delay. In this context, it is to be noted that the OFF-state may be defined in various ways. One possibility would be to use a narrow interpretation encompassing only the actual OFF state where the machine is not rotating at all or a wider interpretation encompassing an idle mode of the machine. Otherwise, the idle mode could be handled as a third operating state differing from the actual OFF-state and the ON-state.

According to a further aspect of the invention, it is proposed that the control unit is configured to determine a remaining lubricant volume in the lubricant reservoir based on a processing of the sensor signals. The inventors have found that the vibrations of the lubricator, in particular in a case where the sensor is a vibration sensor attached to a wall of the housing of the lubricator or on the Printed Circuit Board with the micro-controller electronics, strongly depend on the volume in the lubricant reservoir as the latter is decisive for the weight and inertia of the lubricator. This can be used to detect the lubricant level using the vibration amplitude and or frequency.

This invention is related to detection of the state of a machine i.e. running—'ON' or stand-still, idle, OFF, to start or stop a device that is servicing or monitoring the machine. In particular, a lubrication device that is connected with the grease-supply nipple to a machine is able to detect if the machine or process is in "ON" or in "OFF" state to be able to switch the lubricator device off. A sensing principle needs to be applied which results in a sensor-signal with good discrimination or differentiation between the "ON" and "OFF" state. In particular for a single-point lubricator with an electro-motor and battery operation, no wires need to be connected to the machine or to sensors placed on the machine.

The invention disclosure presents the idea to use a statistical testing approach to detect the "ON" or "OFF" state of the machine. This is in itself known in statistics, but not in detecting the machine state. The technical prejudice that operating states of machines should be detectable with a reliability of 100%, which may be true in other fields of application, has turned out to be unfounded in the field of lubrication devices, which do not need to react very quickly in most cases.

The invention is generally applicable to all kinds of applications which have a service or device connected to a machine or process and the service or device needs to be stopped if the machine or process is in 'idle' or 'off' state.

An alternative method would be to look for the frequency content between 'idle' and 'non-idle' and then with digital-filtering, a discrimination and detection algorithm can be developed. The advantage of the more statistical approach is that it is not required to know the frequency content or the differences between 'idle' or 'non-idle' state. However, the sensor signal needs to have sufficient frequency-content in the spectrum that changes from 'idle' and 'non-idle' mode. In statistical terms there has to be sufficient statistical significance in the signal when the machine state changes from 'idle' to 'non-idle' or from "ON" to "OFF".

In some machines or applications it may be possible to detect not only the "ON" state but also the level of operation (speed, load). This may be detected by a change in the statistical content (mean, variation) during a time-window. This can possibly be used also to adapt the lubrication-rate setting, within a limited span of settings. Such a functionality makes the rate with which the lubricant reservoir is emptied somewhat unpredictable. But, the detection and signaling of the (state of the) remaining grease-volume can help and support the end-user or operator in the monitoring of the correct functioning of the lubricators and of the machines. The signaling may be done using a LED-light signaling when e.g. a certain threshold level of remaining grease-volume has been passed, and it can be transmitted using low-power wireless emission technology to a central factory control unit or operating room.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE EMBODIMENTS

Figure 1:
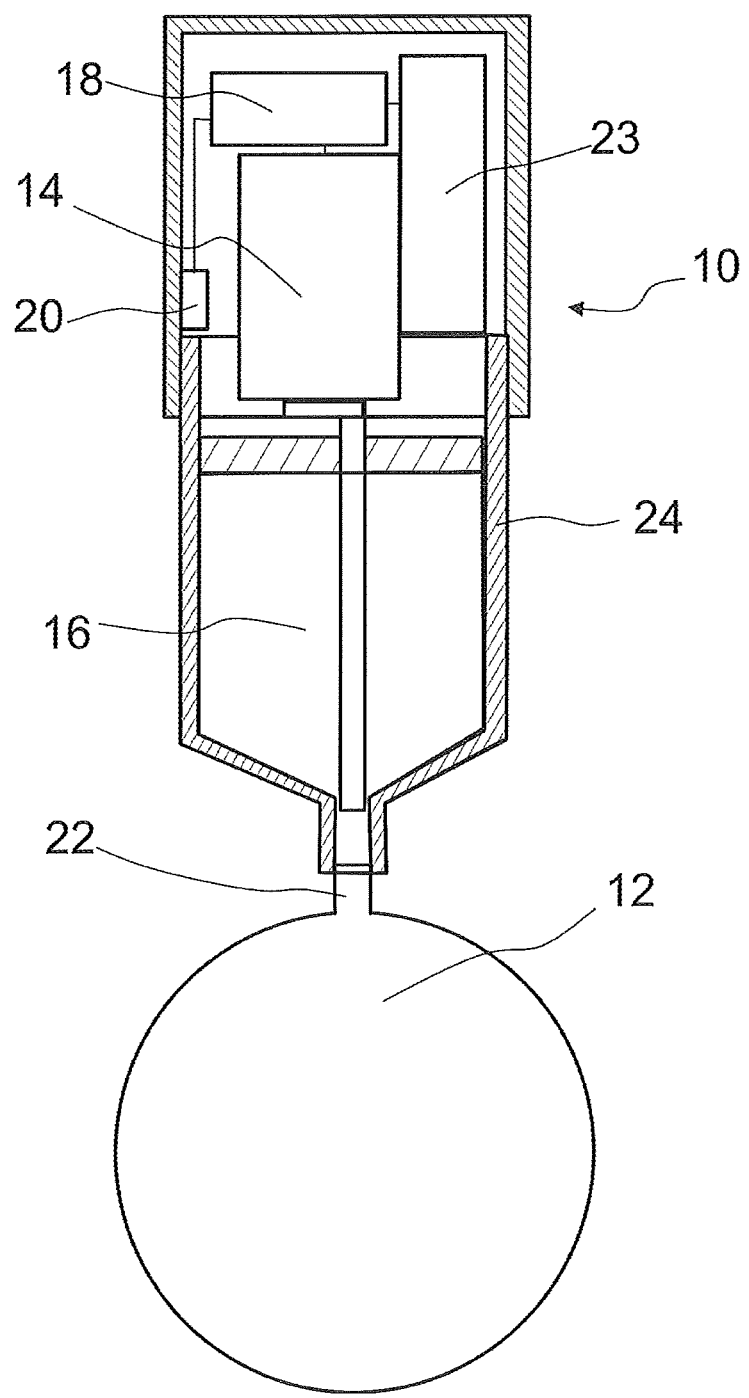
FIG. 1 is a lubricating device according to the invention mounted on an electromotor.

FIG. 1 is a lubricating device 10 according to the invention mounted on an electromotor 12. The lubricating device 10 includes a lubricant pump 14, a lubricant reservoir 16 for supplying lubricant to the electromotor 12 as the machine to be lubricated and a battery 23. A control unit 18 for operating the lubricant pump based on the signals of a sensor 20 configured to detect emissions emanating from the electromotor 12 is provided in a housing 24 accommodating the reservoir 16, the lubricant pump 14 and the control unit 18. The control unit 18 detects the operating state of the electromotor 12 as described below.

The lubricating device 10 is attached to a lubrication nozzle 22 of the electromotor 12. The attachment to the nozzle 22 is done by means of a screw connection and is stiff enough to transmit at least a part of the vibrations emanating from the electromotor 12 to the housing 24 of the lubricating device 10. The housing 24 of the lubricating device 10 vibrates when the machine 12 is operating and does not vibrate or vibrates with smaller amplitude when the machine 12 is not operating, i.e. is in an off-state. The sensor 20 is mounted within the housing 24 of the lubricating device 10 at a place where sufficiently strong vibrations transmitted over the nozzle 22 can be measured while being protected and screened from the environment. Suitable mounting positions include a lubricant outlet directly attached to the nozzle 22 or an inner wall of a motor compartment of the lubricating device 10 or integrated with the Printed Circuit Board already present for the microcontroller chip in the control unit 18 for the motor-control.

The control unit 18 receives and processes the signals of the sensor 20 and has software to determine an operating state of the machine 12 to be lubricated based on the signals of the sensor 20. The software basically decides that the machine 12 is operating if the strength of the vibrations exceeds a certain threshold level, wherein the strength can be measured in terms of the (average) amplitude, the variance, the standard deviation or a combination of statistical parameters derived from the signal or from a derivative of the signal obtained by filtering.

The control unit 18 determines the operating state not in a continuous way but rather in intermittent time windows 26a, 26b (FIG. 3) separated by intervals 28a, 28b (FIG. 3) wherein operating state is not monitored. In other words, the reading of the signals of the sensor 20 by the control unit 18 is limited to a predetermined set of time windows 26a, 26b with a predetermined width, wherein the time windows are separated by an interval where the signals of the sensor 20 are not read.

Each machine has typical operating cycles and pertinent time scales. Some machines are operated only for a few minutes and then stand still for hours or days and other machines operate continuously for multiple hours or days and have intervals of standstill during weekends or holidays or due to environmental factors (summer, winter, etc.). The width of the time windows 26a, 26b is set such that it is at least 10 times smaller than an average on-time and an average off-time of the machine to be monitored. The likelihood that a window overlaps with a transition operation from ON state to OFF state is therefore lower than 10% and can be reduced further by reducing the ratio. If a time-window overlaps a transition-event, the effect is simply that it can lead to a wrong diagnosis of or a decision on the operating state in that particular time window, but, the decision to start or stop lubrication is preferably not based on just 1 decision-state.

Also it should be pointed out, that if the machine state is correctly diagnosed as "On", the lubricator will execute a lubrication rate or interval, pre-set by the end-user or operator. When the machine goes to the "OFF" state the lubricator may still continue to lubricate at a few instances dictated by the lubrication-rate-setting, until the decision-algorithm has detected the "Off"-state for a number of time-instances in a row and the lubrication is 'put on hold' or goes in to safety lubrication-rate mode. If both the machine and the lubricator are in the "Off" state the state-detection can be implemented in the lubricator such that at regular time-intervals the statistical value is determined or a 'wake-up' trigger can be used, as some vibration- or accelerometer semiconductor chips have "tap" detection functionality to wake up from 'standby-sleep' mode.

On the other hand, the interval 28a, 28b should be chosen such that relevant changes of the operating state are safely detected. In this context, changes are to be considered relevant if a failure to adapt the lubrication rate would lead to either damages or increased wear because of lacking lubricant or to a waste of lubricant due to long-lasting undetected OFF-states. This implies that the sampling intervals should be smaller than the typical on-times and off-times of the machine, whichever is smaller.

For each sample, the control unit 18 determines at least one statistical parameter of a sample of sensor signals, to compare the statistical parameter with at least one predetermined threshold value 30 and to determine an operating state based on the result of the comparison.

Figure 2:
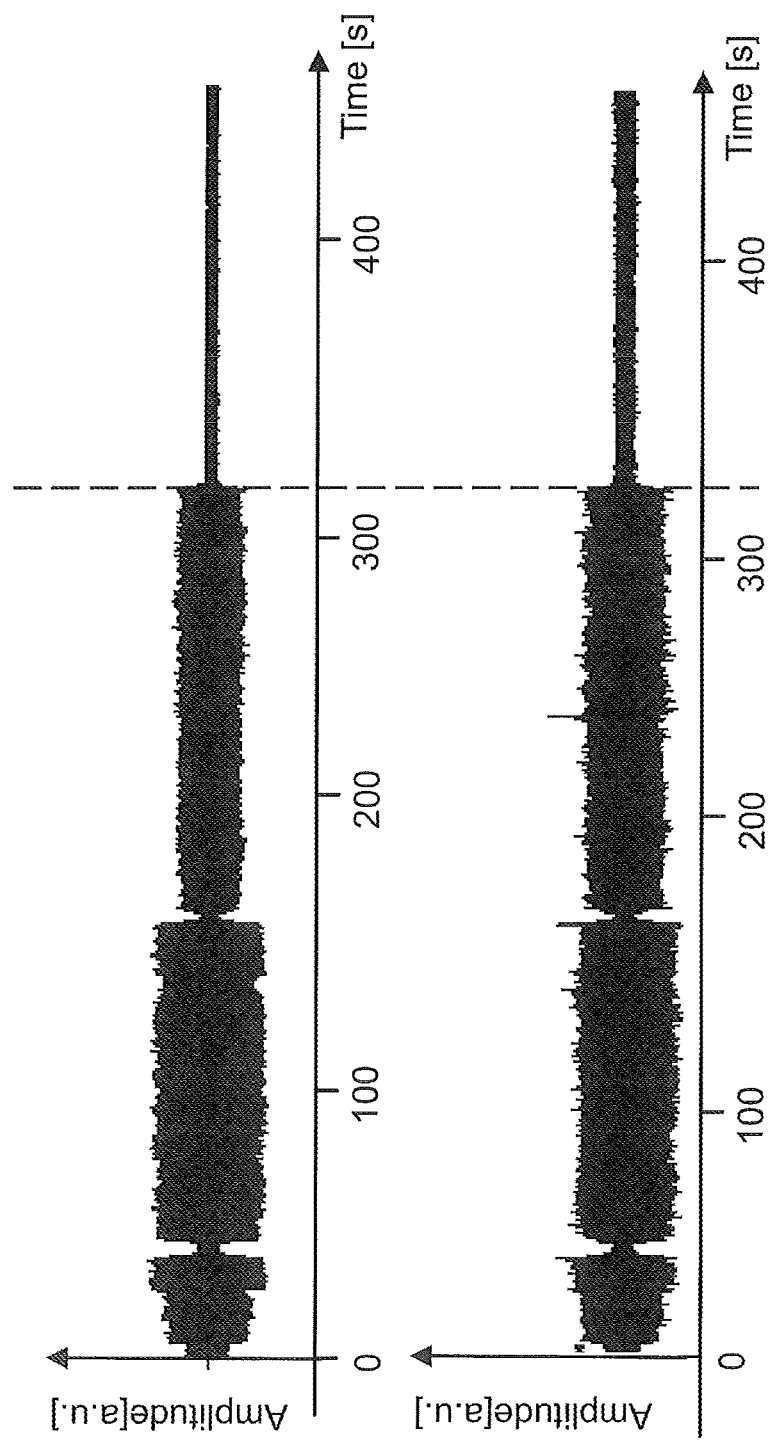
FIG. 2 is a graph showing sensor signals of a vibration sensor of the lubricating device according to claim 1 in different operating states.

FIG. 2 is a graph showing sensor signals of the vibration sensor 20 of the lubricating device 10 of FIG. 1 in different operating states of an electromotor in a steel factory. The upper graph shows vibrations measured in a vertical axis and the lower graph shows vibrations measured in a horizontal axis. Different operating modes with different loads or rotational speeds qualifying as "on-states" are clearly discernible on the left hand side of the dashed vertical line and an off-state or standstill state corresponds to the portion of the graph on the right hand side of the dashed vertical line. Some vibrations are measured in the off state. These may be caused by external noise existing in the factory site.

Figure 3:
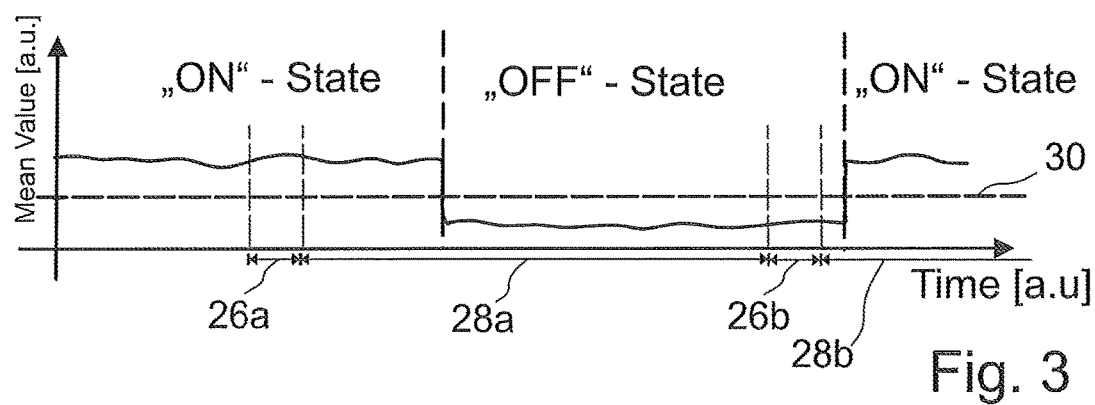
FIG. 3 is a graph illustrating time windows within which the sensor signals are subjected to statistical hypothesis testing.

FIG. 3 is a graph illustrating time windows 26a, 26b within which the sensor signals are subjected to statistical hypothesis testing. The graph shows a typical example of a mean value of the amplitude of the sensor signal, which is, however, not processed continuously but only in certain time windows 26a, 26b. A similar graph would be found when plotting e.g. the variance of the signal or the standard deviation of the signal within a floating time window 26a, 26b. The width of the time windows 26a, 26b is chosen such that a number of the order of 500 data points from the sensor signal are sampled. The number of data points is chosen such that it is not too low because of statistical confidence, not too many data points both because of computational processing power and because of memory capacity reasons. A dashed horizontal line indicates a threshold value for the mean value 30 of the amplitude. The control unit 18 calculates the average value of the amplitude for the data points within the window 26a, 26b and compares this average with the threshold value 30. If the average falls short of the threshold 30, the control unit 18 concludes that the hypothesis "OFF-state" is true, otherwise, the null-hypothesis "ON-state" is true. The statistical hypothesis testing can be done using more complex models and combinations of statistical parameters if desired. It is further possible to use different threshold values for switching from an ON-mode into an OFF-mode and from an OFF-mode into an ON-mode such that a hysteresis is generated.

The detection of an OFF-state of the machine does not necessarily mean that the lubrication is immediately stopped or that the lubricant pump is completely stopped. Rather, the control unit 18 may switch into a safety lubrication mode upon detecting an OFF-state of the machine 12 to be monitored for two or more subsequent samples of sensor signals. A small amount of lubricant is then still supplied in the safety lubrication mode such that a minimum lubrication is guaranteed for the case that the starting of the machine is not detected or detected with delay.

In a further embodiment of the invention, the control unit 18 determines a remaining lubricant volume in the lubricant reservoir 16 based on a processing of the sensor signals. A resonance frequency of the vibrations of the lubricating device depends on its total mass and hence on the amount of lubricant remaining in the lubricant reservoir 16. The mass decreases and the resonance frequency increases with decreasing volume of lubricant. The control unit 18 may therefore detect a shift in a frequency peak in the frequency spectrum of the signal of the vibration sensor 20 and determine the volume of the lubricant in the reservoir 16 by referring to a predetermined characteristic or table.

Further, the amplitude of the vibrations increases with decreasing inertia of the lubricating device 10 such that the amplitude for a given frequency or for a shifting frequency peak may be used as an indicator for the amount of lubricant needed as well. In a preferred embodiment, the frequency components typical for asynchronous electrical machines are filtered out of the signal of the vibration sensor 20. These correspond to inter or half-integer multiples of the line frequency of e.g. 50 Hz, depending on the number of poles and the operating speed. Further, it would be possible to monitor the amplitude in a low-pass frequency band as specified for the vibration sensor 20 selected. The control unit 18 issues a warning signal upon detecting that the remaining lubricant volume falls short of a predetermined threshold value. For this purpose, the lubricating device may be equipped with LED's indicating the filling level. The LED may start flashing when a certain filling level has passed and a refill is expected/advised within a certain time-frame.

Figure 4:
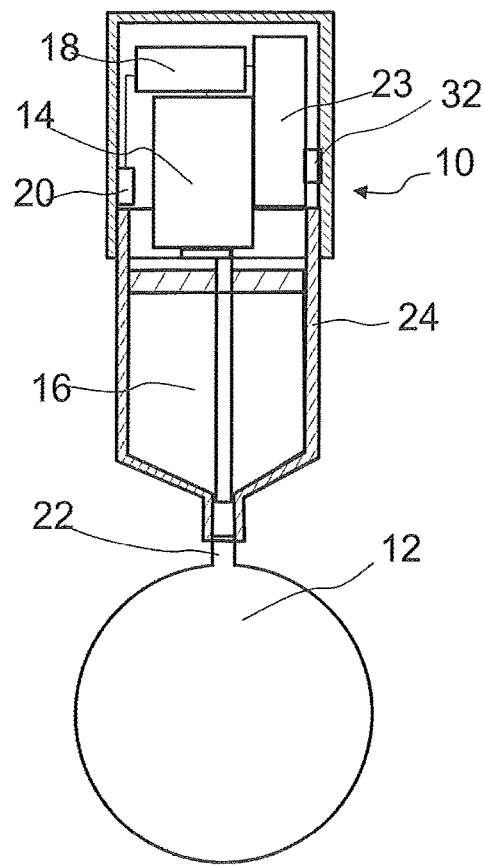
FIG. 4 is a lubricating device according to a second embodiment of the invention including a piezo-actuator.

In a further embodiment of the invention illustrated in FIG. 4, a piezo-actuator 32 is integrated in the housing 24 of the lubricating device. The piezo-actuator 32 can actively generate vibrations of the housing 24 at one or more predetermined frequencies or with a sweeping frequency. These vibrations are generated in a controlled way such that the response to these vibrations as measured by the vibration sensor 20 yields very reliable information on the inertia of the lubricating device 10 and can be used by the control unit 18 to determine the filling state of the lubricant reservoir 16. Such a Piezo-actuator 32 can also be connected to the vibration-structures described further below with reference to FIGS. 5a-5b.

In each of the above cases, vibrations measured in an additional orthogonal axis can be used for redundancy and increase of confidence level.

Depending on the nature of the sensor signal, there are different possible scenarios:
A) If the sensor-signal is bi-polar (Amplitude >0 and <0) with a mean that does not change when the machine changes from 'idle' to 'non-idle' state, the statistical test can test for variance or standard deviation.
B) If the sensor-signal is bi-polar with a mean that does change when the machine changes from 'idle' to 'non-idle' state, the test can test for mean value, variance or standard deviation.
C) The sensor-signal is uni-polar (e.g. temperature) (Amplitude >0) with a mean that does not change, again only the variance or standard deviation can be used.

D) The sensor-signal is uni-polar (e.g. temperature) (Amplitude >0) with a mean that does change, then the mean, variance or stdev can be used separately or simultaneously.

For the purpose of the invention, an originally 'bi-polar' signal may be made 'uni-polar' by rectifying and averaging or by determining the 'rms' value. If the sensor-signal is (made) uni-polar then the statistical test can test for mean, variance and standard deviation, separately or simultaneously. Irrespective of which parameter is used, it is important that these statistical parameters or intervals are changing when the machine changes from 'idle' to 'non-idle' state and vice versa.

In the invention presented here, it is not per se necessary that the data samples are statistically independent and that the statistical model employed is a mechanically and physically exact model of the real dynamics of the mechanical system. Rather, the statistical approach has turned out to be sufficiently reliable for the intended purpose although the dynamics of the motor and the lubricating device mounted thereon are, in reality, not random.

FIGS. 5a-5d are schematic illustrations of lubricating devices according to further embodiments of the invention provided with different vibration structures onto which the sensor 20, which is preferably formed as a 3-axis acceleration sensor chip, is mounted.

Figure 5A:
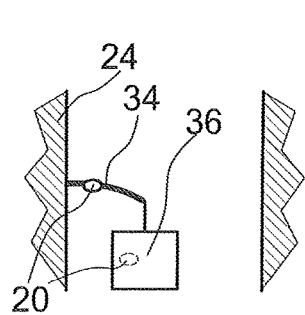
FIGS. 5a-5f are schematic illustrations of lubricating devices according to further embodiments of the invention provided with different vibration structures.

In the embodiment illustrated in FIG. 5a, a flexible beam 34 is attached or clamped to an inner wall of the housing 24 and a mass 36 is attached to the end thereof. The vibrating structure including the mass 36 and the flexible beam 34 has a well-defined resonance frequency and the amplitude of the vibrations of the mass system depends on the operating state (ON/OFF) and on the volume remaining lubricant in the reservoir 16 sufficiently strong to derive information from the information amplitude measured by the sensor 20. The sensor 20 may be attached to the mass 36 or to the beam 34 or two or more sensors may be provided on the vibrating system and/or on the housing 24.

Figure 5B:
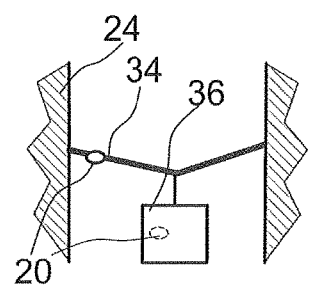

In the embodiment illustrated in FIG. 5b, a flexible beam or string 34 is attached to opposite inner walls of the housing 24 and a mass 36 is attached to a middle portion thereof. The vibrating structure includes the mass 36 and the flexible string 34 and the sensor 20 may be attached to the mass 36 or to the string 34.

Figure 5C:
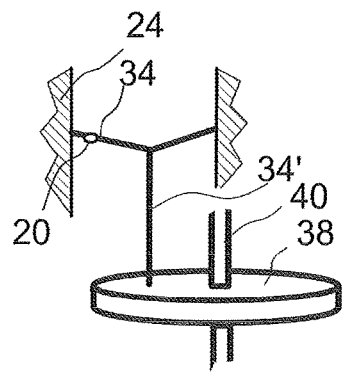

The embodiment in FIG. 5c differs from the embodiment in FIG. 5b in that the tension of the beam or string 34 attached to the inner walls of the housing 24 is not created by a mass but by a string or spring 34' connecting the middle portion of the string 34 to a piston 38 of the lubricant pump 15. When the piston 38 is pushed downward by rotation of a spindle 40 driven by the electromotor 12, the tension and thus the resonance frequency in the vibrating system including the string 34 and 34' increases such that the resonance frequency measured by a vibration sensor 20 attached to vibrating parts of the system increases as well.

A further embodiment (not illustrated) would include a tension wire similar to the string or spring 34' which would, however, not be attached to the moving piston 38 but rather unwound by the electromotor 12 when being driven such that the tension would decrease as a function of decreasing volume of remaining lubricant.

Figure 5D:
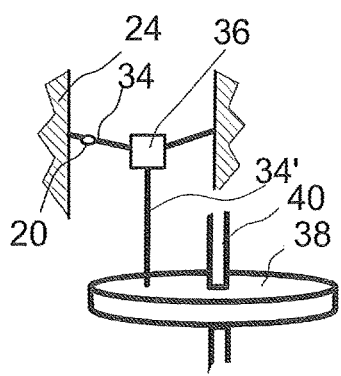

The embodiment in FIG. 5d differs from the embodiment in FIG. 5c in that a further mass 36 is attached to a branching point of the beam or string 34 and the string or spring 34' to adapt the resonance frequency as needed.

Figure 5E:
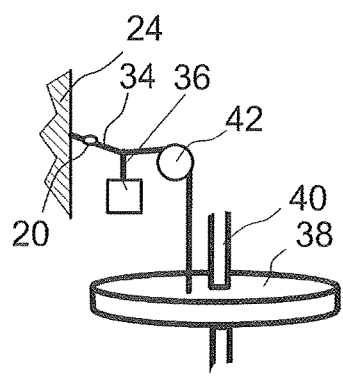

In the embodiment of FIG. 5e, one end of a string 34 is attached to the inner wall of the housing 24 and the string 34 is then guided to the piston 38 via a rolling contact 42. A mass 36 is suspended on the part of the string 34 between the housing wall and the rolling contact 42. The tension of the string 34 and the resonance frequency of the system increase when the piston 38 is pushed downward to deliver lubricant.

Figure 5F:
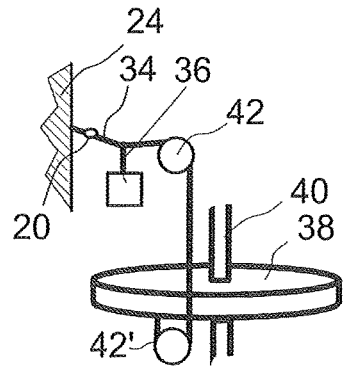

The embodiment of FIG. 5f differs from the embodiment of FIG. 5e in that the string is guided over a second rolling contact 42' underneath the piston 38 such that the tension of the string 34 and the resonance frequency of the system decrease when the piston 38 is pushed downward to deliver lubricant.

REFERENCE SIGNS 10 lubricating device
12 machine
14 pump
16 reservoir
18 control unit
20 sensor
22 nozzle
24 housing
26a, 26b time window
28a, 28b interval
30 threshold value

The invention claimed is:

1. A lubricating device including a lubricant pump, a lubricant reservoir for supplying lubricant to a machine to be lubricated, a control unit for determining an operating state of a machine and for operating the lubricant pump based on signals of at least one sensor configured to detect emissions emanating from the machine to be lubricated, and a housing configured to be attached to a lubrication nozzle of the machine to be monitored,
wherein a reading of the signals of the sensor by the control unit is limited to a predetermined set of time windows with a predetermined width, and
wherein the time windows are separated by an interval where the signals of the sensor are not read,
wherein the sensor is disposed in the housing.

2. The lubricating device according to claim 1, wherein the control unit is configured to determine an operating state of the machine to be lubricated based on the signals of at least one sensor.

3. The lubricating device according to claim 1, wherein the width of the time windows is chosen such that at least 100 data points from the sensor signal are sampled.

4. The lubricating device according to claim 1, wherein the width of the time windows is at least 10 times smaller than an average on-time and an average off-time of the machine to be monitored.

5. The lubricating device according to claim 1, wherein the control unit is configured to determine at least one statistical parameter of a sample of sensor signals, to compare the statistical parameter with at least one predetermined threshold value and to determine the operating state based on the result of the comparison.

6. The lubricating device according claim 5, wherein the control unit is configured to use different threshold values for switching from an from an ON-mode into a an OFF-mode and from an OFF-mode into an ON-mode such that a hysteresis is generated.

7. The lubricating device according to claim 5, wherein the statistical parameter is at least one of a variance, a standard deviation and an average value of the sensor signals.

8. The lubricating device according to claim 1, wherein the control unit is configured to switch into at least one of an OFF-mode where no lubricant is supplied and into a safety lubrication mode upon detecting an OFF-state of the machine to be lubricated for two or more subsequent sample windows of sensor signals.

9. The lubricating device according to claim 1, wherein the sensor is a vibration sensor.

10. The lubricating device according to claim 1, wherein the control unit is configured to determine a remaining lubricant volume in the lubricant reservoir based on a processing of the sensor signals.

11. The lubricating device according to claim 1, wherein the control unit is configured to issue a warning signal upon detecting that the remaining lubricant volume falls short of a predetermined threshold value.

12. The lubricating device according to claim 1, further comprising a vibration structure to which the sensor is attached.

13. A lubricating device including a lubricant pump, a lubricant reservoir for supplying lubricant to a machine to be lubricated, a control unit for determining an operating state of a machine and for operating the lubricant pump based on signals of at least one sensor configured to detect emissions emanating from the machine to be lubricated, and a housing configured to be attached to a lubrication nozzle of the machine to be monitored, wherein a reading of the signals of the sensor by the control unit is limited to a predetermined set of time windows with a predetermined width, and wherein the time windows are separated by an interval where the signals of the sensor are not read, wherein the control unit is configured to switch into a safety lubrication mode upon detecting an OFF-state of the machine to be monitored, wherein a nonzero amount of lubricant is supplied to the machine in the safety lubrication mode, and wherein the nonzero amount of lubricant is smaller than an amount of lubricant supplied in at least one operation mode employed when an on-state has been detected.

14. A lubricating device including a lubricant pump, a lubricant reservoir for supplying lubricant to a machine to be lubricated, a control unit for determining an operating state of a machine and for operating the lubricant pump based on signals of at least one sensor configured to detect emissions emanating from the machine to be lubricated, and a housing configured to be attached to a lubrication nozzle of the machine to be monitored, wherein a reading of the signals of the sensor by the control unit is limited to a predetermined set of time windows with a predetermined width, and wherein the time windows are separated by an interval where the signals of the sensor are not read, wherein a vibration structure interacts with a piston of the lubricant pump such that a resonance frequency of the vibration structure depends on a position of the piston.

* * * * *